United States Patent Office 3,367,784
Patented Feb. 6, 1968

3,367,784
GEL COMPOSITION AND PROCESS
Reuben Homer Waitman, Pearl River, and Joseph W. Hoos, White Plains, N.Y., assignors to General Foods Corporation, White Plains, N.Y., a corporation of Delaware
No Drawing. Filed Dec. 4, 1964, Ser. No. 416,136
9 Claims. (Cl. 99—132)

This invention relates to a gel composition and to a process for preparing the same. More particularly, this invention relates to a shelf-storable, storage-stable gel composition which is adapted for immediate use or consumption. Still more particularly, this invention relates to a novel pectin gel composition having desirable mouth melt and texture characteristics which is distributed and sold in a gel state in a can, jar, or other suitable container thereby offering convenience and economy to the consumer.

It is well known that gelatin desserts may be obtained by dissolving gelatin mixes which are sold in granular or powdered form with hot or warm water to form a solution, and then allowing such solution to stand, usually in a refrigerator, in order to coagulate or to gel the solution. Many consumers consider such a preparation to be time-consuming and bothersome and have expressed the desire to have available a gelatin dessert or a flavored gelatin-like dessert, which requires little or no preparation and which is ready for immediate use or consumption.

To the present, such desire has not been fully satisfied. While there have been and are available gelatin desserts which are said to be immediately available for serving, upon opening a container with the same therein, such products are not only difficult to prepare from a large scale manufacturing viewpoint, but also create numerous problems in the distribution and sale thereof. Thus, while the concept of a canned gelatin dessert has heretofore been suggested, such product is observed to have a tendency, upon storage, to disintegrate into a thin, only slightly viscous fluid due to acid hydrolysis. Needless to say, such product is completely unacceptable to a consumer. For example, it has been observed that if a prepared gelatin dessert is canned and is then stored for several weeks at 90° F., the gelatin solution is hydrolyzed to the point where it will no longer form a gel. In an attempt to alleviate this condition, use of higher gelatin levels has been proposed. However, such product is considered to have a rubbery texture and is, therefore, also unsatisfactory.

To overcome problems inherent with a canned gelatin dessert, it has also been suggested to furnish prepared gelatin dessert products which would have wide consumer acceptance and which would not be characterized by the disadvantages enumerated for a canned gelatin. An approach here taken has been to distribute and to sell such gelatin dessert products under and in a refrigerated state. However, the disadvantages are only temporarily allayed for it has been noted that even rubber-like characteristics are evident after prolonged storage under refrigerated conditions and gel degradation is also observed. It appears that the rubber-like conditions are caused by a buildup or increase in that property of such gel products usually defined as gel strength. To forestall gel degradation, higher gelatin levels have been employed resulting in, as mentioned, rubber-like textures.

Apart from these disadvantages, the food manufacturer is faced with higher costs for a refrigerated gelatin dessert product. The manufacturer must provide refrigerated distribution channels and must see to it that his product is displayed and sold in a refrigerated condition. Some food manufacturers take numerous safe-guards to insure against a consumer purchasing a refrigerated gelatin dessert product which would be rubbery or watery in appearance, of off-taste, and poor texture by periodically removing their products from refrigerated storage and display areas and replacing them with fresh products. It is, therefore, apparent that the short shelf life of such gelatin dessert products, even under the most desirable storage conditions, leaves much to be desired from the point of view of both the food manufacturer and the consumer.

It is an object of the present invention to provide a gel composition and process for preparing same whereby the foregoing disadvantages may be overcome or substantially eliminated.

It is a further object of this invention to provide a shelf-storable, storage-stable gel composition which is ready for immediate use or consumption upon removal of the composition from its container.

It is a still further object of this invention to provide a novel pectin gel composition having desirable mouth melt and texture characteristics which is distributed and sold in a gel state in a can, jar, or other suitable container thereby offering convenience and economy to the consumer.

It is an even still further object of this invention to provide a novel prepared pectin gel composition having incorporated therein fruits, vegetables, and the like.

In accordance with the present invention, it has now been discovered that a shelf-storable, storage-stable gel composition may be obtained by employing a low methoxyl pectin in combination with a source of calcium ions in an amount sufficient to form such gel having optimum mouth-melt and texture characteristics.

The gel composition of this invention also includes, in combination, a source of ions of another alkaline earth metal, preferably magnesium.

The gel composition of this invention further comprises acid, buffer or solublizer, flavor, color and preservative.

The pectin employed should have a methoxyl content of 25–35% based upon the total number of groups such as methoxy groups, carboxy groups, etc., which may be present in the pectin molecule, or, expressed in another manner, the percent of free carboxy groups should be within the range of 12–20% of the total number of carboxy groups, methoxy groups, etc., in the pectin molecule.

Alternatively stated, such low methoxyl pectins suitable for use in preparing the novel gel compositions of this invention should, or must have, a methoxy group content of 2.5–6.5%, preferably 4.0–5.0%, based upon the total weight of the pectin molecule. If pectins are employed having a methoxyl content less than about 2.5%, a gel is still obtained but a precipitate of calcium pectinate may also be formed. At methoxy group contents above about 6.5%, larger quantities of solids, typically sugar, are needed in order to form a gel. Such gels with unusually high solids content are not especially satisfactory from a texture or taste point of view and are, therefore, generally less desired.

Low methoxyl pectins suitable as the gel-forming ingredient in the novel gel compositions of this invention may be prepared by any of a wide variety of methods. Thus, pectins obtained from citrus fruits, apples, and the like may be subjected to treatment with acid, alkali or enzymes so as to obtain a pectin having the methoxy group content as above specified. Such methods are well-known in the art of low methoxyl pectin manufacture. However, it has been found especially advantageous to employ a low methoxyl pectin which is prepared by treatment of pectin with an alcohol ammonia solution. The low methoxyl pectin product obtained by such process, which is described in U.S. Patent No. 2,480,710 to Bryant, is characterized by having amide groups in the pectin molecule, said groups having been obtained by conversion of the methoxy or ester groups in the pectin employed with alcoholic ammonia solution. Such low methoxyl pectins, usually termed amidized pectins, are thus characterized by their low methoxy group content and the presence therein of amide groups and ammonium salt moieties.

Regardless of the type of low methoxyl pectin which may be utilized, it has been further found that the low methoxyl pectin which in addition to having its methoxy group content within the range defined as above, should also have a gel power of 130 minimum, and preferably, 140–150.

The low methoxyl pectin is further characterized by its load weight. The load weight of the low methoxyl pectin employed has been found to be critical in obtaining a finished gel composition having the desired storage, stability, texture and taste characteristics. Load weight as a characterizing property of the low methoxyl pectin employed is determined by measuring the gel strength and gel viscosity.

Test methods for making such measurements are as follows:

Gel strength is measured upon a sample of a typical gel composition, for example, having the ingredients as recited in Example 1 hereinafter. The ingredients are mixed with boiling water, forming an approximately 20–22% solution, which is then allowed to stand at room temperature for thirty minutes. The solution is placed in a Bloom jar of 120 milliliters capacity and the capped jar is inserted in a 50° F. chill bath for one hour. At the end of this period the jar is removed and the gel is tested employing a Bloom gelometer set at 45 grams—5 second shot flow—1 inch plummet. The gel strength is recorded as the weight in grams required to depress the plummet four millimeters into the gel.

Gel viscosity is measured using a Brookfield Synchro-Electric Viscometer, Model HAT, frequency 60, 110 volts; Helipath stand, Model C, frequency 60, 115 volts; a TB spindle (run at 50 r.p.m.). After the gel strength measurement, as described hereinbefore, has been made on a sample the spindle is manually lowered to the midpoint of the gel. The spindle is turned on and allowed to run for one minute with Helipath off. The spindle lock is depressed and held, the spindle is turned off and viscosity is then read on a scale of 0–500. The gel viscosity is recorded as Brookfield units.

It has been determined that the gel strength and gel viscosity of the low methoxyl pectin ingredient are critical in the obtaining of a gel composition whose gel strength is within the range of 20–50 grams, and preferably about 35 grams, and a gel viscosity within the range of 130–400 Brookfield units, and preferably about 240 Brookfield units. Maintaining the gel strength and gel viscosity of the finished gel composition within these ranges has been found essential for avoiding a major problem frequently encountered with gel systems, namely, that of syneresis. Syneresis is best explained as exudation or weeping of water from a gel. While this condition is most frequently brought on by subjecting a gel product to rough handling similar to that which occurs during shipment, other causes of syneresis are known. It has been found that the gel strength and gel viscosity of the finished gel composition of this invention have a definite relationship, one to the other, which appears to establish that syneresis may be substantially avoided by having a gel composition with a gel strength of 20–50 grams and a gel viscosity of 130–400 Brookfield units, as previously stated. While syneresis may not be evident in gel compositions having gel strengths and viscosities outside of these ranges, it has been noted that the gel texture and taste characteristics of the gel composition are not optimum. Thus, it is seen that the problems of providing a gel composition which is shelf-storable and storage-stable are overcome by the present invention, while at the same time, the texture and taste characteristics of the gel composition so provided are optimum.

The calcium ions may be provided by any soluble, edible, inorganic or organic calcium salt, oxide or hydrated oxide. Calcium salts, however, are preferred and among those which may be employed are calcium carbonate, calcium sulphate, monocalcium phosphate, tricalcium phosphate, calcium chloride, calcium propionate, calcium malate, calcium citrate, calcium lactate and the like. The ratio of calcium to low methoxyl pectin must be maintained within the range of about 1:20 to about 1:5. Stated in another manner, the amount of calcium salt to low methoxyl pectin, on a weight basis, is within the range of about 10–50%, thus taking into account the molecular weight of the salts employed and the amount of available calcium therein.

In addition to calcium ions being provided in the gel composition so as to form calcium pectinates, the gel-forming ingredient of the gel composition of this invention, it has also been found advantageous to furnish ions from soluble, edible compounds of other alkaline earth metals such as magnesium, barium, and strontium, or from other divalent or trivalent metals such as iron and aluminum. Of these magnesium ions are especially preferred and may be supplied by utilizing an edible magnesium salt, oxide or hydrated oxide in combination with a calcium salt, oxide or hydrated oxide, preferably a calcium salt. While it is possible to employ any of such alkaline earth metals, including magnesium, to replace all of the calcium, it has not been found desirous to do so. Accordingly, the preferred gel compositions of this invention are prepared from a solution of calcium ions in combination with a solution of ions of a different alkaline earth metal, typically magnesium ions. For example, it has been noted that calcium ions are especially effective in reacting with the low methoxyl pectin so as to achieve finished gel compositions having desired gel strengths and gel viscosities. The presence of magnesium ions appears to permit the gel viscosity to be maintained within acceptable limits. Accordingly, the use of magnesium oxide in combination with a calcium salt is a preferred embodiment of this invention. While no particular theory is advanced for the superior results noted to be obtained when employing such combinations, it appears that magnesium in addition to, perhaps behaving like calcium and reacting with a low methoxyl pectin, also tends to make the calcium low methoxyl pectin reaction reversible. Because of this reversible reaction, the gel composition possesses certain melt characteristics, principally a lower melting temperature, thereby improving mouth-feel and flavor release.

The amount of magnesium salt, oxide or hydrated oxide employed is determined by the load weight, that is, the gel strength and gel viscosity and the gel power of the low methoxyl pectin employed and the amount of calcium salt oxide or hydrated oxide utilized. While it is evident that in view of the low methoxyl pectin and calcium variables, the amount of magnesium salt, oxide or hydrated oxide may be varied over a wide range, it has been found especially advantageous to employ magnesium oxide in a ratio of from about 1 to 4 based on the weight of calcium salt used.

The acid employed may be any one of the commonly used edible organic or inorganic acids. Suitable acids include citric, malic, tartaric, fumaric, adipic, ascorbic, phosphoric and the like. Of these, citric is especially preferred. The amount of acid employed is such as to give a final pH in the gel composition between 3.50 and 4.50 and, preferably, 4.0 to 4.2. The amount of acid may thus be varied to meet these pH requirements and, of course, the actual amount of acid is dependent upon the pH of the low methoxyl pectin, the amounts of calcium salt and buffer, and type of buffer used.

Any of a large number of buffers and solubilizers may be utilized including sodium and potassium phosphates as, for example, tetrasodium pyrophosphate, sodium acid pyrophosphate, trisodium phosphate, monosodium phosphate, sodium hexametaphosphate, sodium and potassium citrates, tartrates, malates, fumarates, adipates and ascorbates. Of these, trisodium citrate is especially preferred. Generally, the amount of buffer or solubilizer is employed in a ratio of about 1:5 to 4:5, based on the weight of acid used.

The type or amount of sugar employed is not especially critical in obtaining satisfactory gel compositions according to the present invention. Thus, sugars such as sucrose, dextrose, lactose, maltose, fructose, and the like may be employed. Further, syrups of such sugars may be used with advantage to provide ease of handling during manufacture.

It is further contemplated that sweeteners other than sugars may be employed. Thus, artificial sweeteners such as sodium, potassium, calcium, magnesium cyclamates and sodium, potassium, calcium and magnesium saccharines alone, or in combination, may be used. The artificial sweeteners may also be further employed in combination with sugar or may be employed separately. Thus, the level of artificial sweeteners may be varied over a wide range depending upon the degree of sweetness and flavor desired. However, it is important to note that should an artificial sweetener in the form of its alkaline earth metal salt be employed, appropriate adjustment in the overall calcium/low methoxyl pectin and magnesium/calcium ratios are required. Accordingly, the use of artificial sweeteners in the gel compositions of this invention may thus provide the desired sweetness in the gel composition product and also furnish a source of alkaline earth metal ions, typically calcium and magnesium, for reaction with the low methoxyl pectin.

While, as mentioned, artificial sweeteners may be employed solely or in combination with sugars to provide the sweetness required, it has been found that the presence of sugars in the gel composition appears to forestall or retard the phenomenon of syneresis. Thus, if sugars are employed, the solids content of the gel composition is increased, which appears to have some effect in overcoming the syneresis problem and thereby achieving better shelf-storability and storage-stability. An additional advantage accruing from the use of sugars is that the overall gell characteristics of the gel composition are improved, particularly if fruits are blended with or incorporated in the gel composition. Flavors and colors may be incorporated in the gel composition at desired levels.

While not absolutely essential, any of a large number of suitable preservatives may be added to the gel composition of this invention. As an example of such preservative, sodium benzoate may be mentioned.

The gel compositions of this invention may have incorporated therein whole, sliced or diced fruits or vegetables. Thus, there is obtained a ready-to-serve fruit-or vegetable-type salad gel product. A wide variety of fruits and vegetables may be utilized including oranges, grapefruit, cherries, pineapple, peaches, pears, plums, apricots, celery, carrots, beans, lettuce, cabbage, cucumbers, etc.

It has been found that cooked fruits ordinarily obtained in a heavy sugar pack are especially advantageous in preparing a fruit-containing gel composition. The presence of fruit appears to improve the overall texture and taste of the gel composition product and the use of fruit packed in heavy sugar syrups seems to afford better stability. A further advantage of the use of fruits or vegetables in the gel composition of this invention is found in their increasing the overall solids content of the finished gel composition.

In preparing the novel gel compositions of this invention, water, which is preferably of low hardness, is employed to obtain the aqueous gels which are then placed in suitable containers following known canning, bottling and packing procedures.

Although not required, the gel compositions of this invention may be refrigerated in their containers for a brief period, say less than two hours, prior to serving. Firmness of the gel is thereby slightly improved and shapes, as molded by the container form, may be obtained more readily.

In order to illustrate the present invention, but not to limit it, the following examples in which all parts are by weight, unless otherwise indicated, are given:

*Example 1*

Mix A: | Parts
--- | ---
Pectin [low methoxyl, percent 4.8–5.2; amidized, 143 gel power, pH 4.0–4.3] | 12.60
Citric acid | 12.46
Trisodium citrate | 8.46
Magnesium oxide | 1.36
Sugar, granulated | 216.19
Water, softened | 712.84
Sodium benzoate | 1.28

Mix B: | 
--- | ---
Calcium carbonate | 1.57
Color | 0.30
Flavor | 0.59
Water, softened | 178.21

Mix A is dispersed in 712.84 parts of cold water. The dispersion is then heated to 190° F. and is held at that temperature for complete solution.

Mix B is dissolved in 178.21 parts of 190° F. water and the solution is then added to that of Mix A with good agitation.

Sterile cans (steamed atmospherically in autoclave) each containing approximately 2.5 parts of mixed fruit (peaches, mandarin oranges, cubed pineapple and maraschino cherries) are filled to overflowing with the gel solution, approximately 15.0 parts each, maintained at 190° F. The cans are sealed and inverted.

Samples of the gel composition so prepared, noted to have a gel strength of about 35 grams, a gel viscosity of about 240 Brookfield units and a pH of 4.15–4.35, are considered to have good texture and taste characteristics. Syneresis is not evident in the gel composition. After prolonged storage, approximately six months to one year, browning is not observed. Physical properties including texture and gel strength of the stored gel composition remain at an optimum level.

*Example 2*

The procedure of Example 1 is repeated in all essential respects except that the amount of citric acid is decreased to 11.46 parts, all of the calcium carbonate is replaced by 1.57 parts calcium propionate and the amount of color is decreased to 0.06 part.

Similar results are obtained.

In order to compare and evaluate gelatin dessert compositions with typical gel compositions of this invention, samples of the former are prepared in the manner described hereinbelow.

*Example 3*

A typical gelatin dessert composition is prepared by admixing the following:

| Parts
--- | ---
Sugar | 87.2
Gelatin | 8.8
Adipic acid | 2.8
Buffer (trisodium citrate) | 0.9
Color | 0.2
Flavor | 0.1

In this example, the gelatin employed is a lime conditioned, neutral extracted tanners' stock gelatin having a Bloom of 180–225 grams, a viscosity of 32–48 millipoises, and a pH of 4.3–5.9.

The composition obtained is dissolved in 533 parts of warm water and is then canned and stored.

*Example 4*

The procedure of Example 3 is followed except that the acid ingredient, adipic acid, is omitted from the composition.

*Example 5*

The procedure of Example 3 is followed in all essential respects except that the gelatin employed is of lower Bloom, 100–150 grams.

*Example 6*

The procedure of Example 3 is followed in all essential respects except that the gelatin employed is a pig-stock acid conditioned, acid extracted gelatin having a Bloom of 250–290 grams, a viscosity of 52–64 millipoises, and a pH of 3.9–5.4.

*Example 7*

The procedure of Example 3 is followed in all essential respects except that the gelatin employed is a caustic conditioned, neutral extracted tanners' stock gelatin having a Bloom of 220–250 grams, a viscosity of 60–70 millipoises, and a pH of 5.8–6.5.

Storage tests were conducted and set rate characteristics were determined on the compositions, prepared as described, and the results are summarized in the following tables.

TABLE I.—STORAGE DATA ON CANNED GELATIN DESSERT COMPOSITIONS

[Prepared from various gelatin types]

| Gelatin Dessert Compositions of— | Percent Gel Strength Retention After Storage at— | |
|---|---|---|
|  | Room Temperature | 90° F. |
| Example 3 | [1] 48 | [2] 0 |
| Example 4 | [1] 76 | [3] 56 |
| Example 5 | [1] 50 | [3] 32 |
| Example 6 | [1] 66 | [3] 42 |
| Example 7 | [1] 44 | [3] 0 |

[1] After 10 weeks.
[2] After 3 weeks.
[3] After 5 weeks.

From the above-tabulated results it will be seen that all of the gelatin dessert compositions degraded to a significant and drastic extent after storage both at room temperature and at 90° F. While the improved retention in gel strength of the gelatin dessert composition of Example 4 is noted, it is evident that the absence of acid from such composition which, of course is not customary practice in gelatin dessert manufacture retards the rate of degradation but does not eliminate it. All of the gelatin dessert compositions are therefore rated as unacceptable.

TABLE II.—STORAGE DATA; CANNED PECTIN GEL COMPOSITION VS. CANNED DESSERT GELATIN COMPOSITION

[After 12 weeks' storage at various temperatures]

| | Temperature, °F. | Percent Gel Strength Retention |
|---|---|---|
| Pectin Gel Composition of Example 1 | 70 | 100 |
| | 80 | 99 |
| | 90 | 98 |
| Gelatin Dessert Composition of Example 6 | 70 | 64 |
| | 80 | 56 |
| | 90 | 28 |

In contrast to a canned gelatin dessert composition, it will be evident from the data in the foregoing table that a typical pectin gel composition of this invention retains its gel strength after prolonged storage at room temperature and elevated temperatures to a remarkable degree. Such property is important in providing a consumer acceptable, shelf-storable, storage-stable gel composition as is contemplated in and provided by the present invention.

TABLE III.—SET RATE DATA (50° F. CHILL BATH); CANNED PECTIN GEL COMPOSITION VS. CANNED GELATIN DESSERT COMPOSITION

| | Time (in hours) | Percent Gel Strength |
|---|---|---|
| Pectin Gel Composition of Example 1 | [1] 1 | 100 |
| | 4 | 113 |
| | 24 | 133 |
| | 48 | 136 |
| | 90 | 129 |
| Gelatin Dessert Composition of Example 3 | [1] 1 | 100 |
| | 4 | 174 |
| | 6 | 188 |
| | 9 | 194 |
| | 16 | 249 |

[1] Equivalent to 2–3 hours of household refrigeration.

The test results summarized above indicate that a typical pectin gel composition of this invention maintained or stored at chill temperatures, even after prolonged periods, does not develop an appreciable increase in gel strength as does a gelatin dessert composition. While the gel strength at four hours at such temperature is especially significant from the point of view of the consumer, it is important to note that an immoderate increase in gel strength, as evident in the gelatin dessert composition sample, adversely affects the texture of the gel and thereby renders the same unacceptable.

While the present invention has been described in conjunction with several preferred embodiments, it is to be understood that the invention is not restricted to the modifications herein set forth, but it is intended to include such modifications and variations which are apparent to those skilled in the art. Thus, the invention is not to be limited except as appears in the claims hereinafter.

What is claimed is:

1. A shelf-storable, storage-stable aqueous gel composition comprising a gel prepared from an amidized pectin having a methoxyl content of from about 2.5 to about 6.5%, and a calcium containing compound, the amount of said calcium containing compound being from about 10% to about 50%, based on the weight of said pectin, and acid to bring the pH of said composition to 3.50 to 4.50, said gel having a gel strength within the range of 20–50 grams and a gel viscosity within the range of 130–400 Brookfield units.

2. A composition as in claim 1 further comprising trisodium citrate as a buffer.

3. A composition as in claim 2 further comprising sugar, flavor, and fruit.

4. A composition as in claim 3 in which said calcium containing compound is a calcium salt and further comprising magnesium oxide, the amount of said magnesium oxide being in the ratio of about 1 to 4 based on the weight of said calcium salt.

5. A process for preparing a shelf-storable, storage-stable aqueous gel composition which comprises reacting in an aqueous medium an amidized pectin having a methoxyl content of from about 2.5% to 6.5% and a calcium containing compound, the amount of said calcium containing compound, based on the weight of said pectin, being from about 10% to about 50%, in the presence of acid to bring the pH of the resulting gel composition to about 3.50 to 4.50, said gel having a gel strength within the range of 20–50 grams and a gel viscosity within the range of 130–400 Brookfield units.

6. A process for preparing a shelf-storable, storage-stable aqueous gel composition having a gel strength within the range of 20–50 grams and a gel viscosity within the range of 130–400 Brookfield units which comprises reacting in an aqueous medium an amidized pectin having a methoxyl content of from about 2.5% to 6.5% and a calcium salt, the amount of said calcium salt, based on the weight of said pectin, being from about 10% to about 50%, in the presence of acid and trisodium citrate to bring the pH of the resulting gel composition to about 3.50 to about 4.50.

7. A process as in claim 6 further comprising admixing sugar, flavor and fruit with said composition.

8. A process as in claim 7 further comprising carrying out said reacting in the presence of and with magnesium oxide, the amount of said magnesium oxide being in the ratio of about 1 to 4 based on the weight of said calcium salt.

9. A process as in claim 8 further comprising the steps of placing said composition in a suitable container, sealing said container, and sterilizing said container having said gel composition therein.

References Cited

UNITED STATES PATENTS

| | | | |
|---|---|---|---|
| 1,997,616 | 4/1935 | Wallerstein | 99—132 |
| 2,559,338 | 7/1951 | Barch | 99—132 |
| 2,701,767 | 2/1955 | Twieg et al. | 99—132 |
| 2,809,894 | 10/1957 | Poarch et al. | 99—132 |
| 2,910,365 | 10/1959 | Oliver | 99—132 |

OTHER REFERENCES

Kertesz, Z. I.: The Pectic Substances, Interscience Publishers Inc., N.Y., p. 536, 1951.

A. LOUIS MONACELL, *Primary Examiner.*

J. M. HUNTER, *Assistant Examiner.*